United States Patent

[11] 3,580,152

| [72] | Inventors | Dieter Engelsmann<br>Unterhaching;<br>Rolf Schroder; Erwin Becker, Munchen,<br>Germany |
|---|---|---|
| [21] | Appl. No. | 815,358 |
| [22] | Filed | Apr. 11, 1969 |
| [45] | Patented | May 25, 1971 |
| [73] | Assignee | Agfa-Geuaert Aktiengesellschaft<br>Leverkusen, Germany |
| [32] | Priority | Apr. 19, 1968 |
| [33] | | Germany |
| [31] | | A29659/57a |

[54] PHOTOGRAPHIC APPARATUS
10 Claims, 1 Drawing Fig.

[52] U.S. Cl. ................................................. 95/31FM,
95/31AC, 95/31FL
[51] Int. Cl. ............................................... G03b 1/62,
G03b 1/04
[50] Field of Search........................................... 95/31, 31
(XR), 31 (FSL), 11

[56] References Cited
UNITED STATES PATENTS
| 2,728,281 | 12/1955 | Mihalyi ........................ | 95/31(FSL) |
| 3,110,237 | 11/1963 | Scholkemeier............... | 95/31 |
| 3,473,456 | 10/1969 | Peterson et al. ............... | 95/31 |
| 3,148,605 | 9/1964 | Peterson et al. ............... | 95/31 |
| 2,722,872 | 11/1955 | Schrader...................... | 95/31(FSL) |

*Primary Examiner*—Samuel S. Matthews
*Assistant Examiner*—Russell E. Adams, Jr.
*Attorney*—Michael S. Striker

ABSTRACT: A still camera wherein a pivotable and reciprocable slide permits operation of the shutter release when the film is transported by the length of a frame and when the tip of a tracking lever extends into one of a row of perforations on the film. The film transporting wheel is arrested by an arresting lever when the latter is free to engage a ratchet wheel connected to the film transporting wheel. A star wheel which is rigid with the other two wheels can move the slide to inoperative position only when a tooth of the slide extends into one of several notches provided in the periphery of a disc which is connected to the wheels by a friction coupling. The arresting lever is also provided with a tooth which can engage the ratchet wheel only when a lug of the arresting lever extends into another notch of the disc. When the film is removed, the slide is moved to inoperative position and the arresting lever is caused to engage the ratchet wheel when the transporting wheel is rotated through an angle which is smaller than the angle required to advance the film by the length of a frame.

PATENTED MAY 25 1971
3,580,152
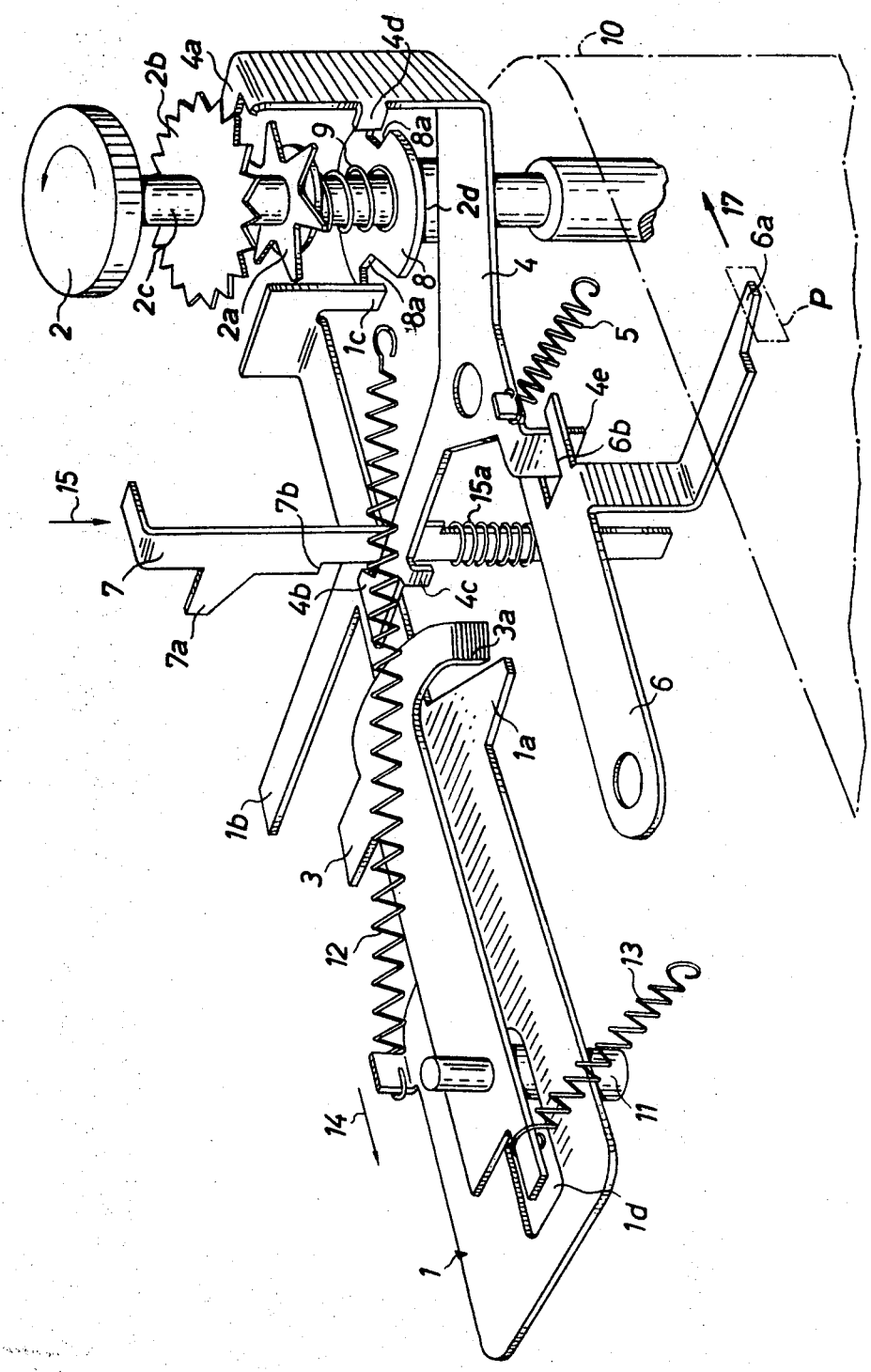
INVENTOR.
DIETER ENGELSMANN
ROLF SCHRÖDER
BY  ERWIN BECKER
Michael S. Striker
Attorney.

PHOTOGRAPHIC APPARATUS

BACKGROUND OF THE INVENTION

The present invention relates to photographic apparatus, and more particularly to photographic cameras which are provided with double exposure preventing means and utilize film of the type having a row of perforations, one for each film frame. Still more particularly, the invention relates to improvements in means for preventing double exposure of film frames in still cameras.

A drawback of presently known cameras which are provided with double exposure preventing means is that the operation of the film transporting mechanism and of the shutter release is blocked when the film is removed so that the mode of operation of the camera cannot be demonstrated without film. In other words, such conventional cameras do not permit depression of the shutter release and/or rotation of the film transporting wheel or lever when the film is removed.

SUMMARY OF THE INVENTION

An object of our invention is to provide a photographic apparatus, particularly a still camera, wherein the operator cannot transport the film beyond the extent necessary to place a fresh film frame into an optimum position for exposure to scene light and wherein the operator cannot expose a given film frame more than once but which enables a person to demonstrate the mode of operation of the camera when the film is removed from the camera body.

Another object of the invention is to provide a novel double exposure preventing device for still cameras and novel means for effecting movements of such device in the course of normal manipulation of the camera with or without film.

A further object of the invention is to provide the camera with novel arresting means for the film transporting mechanism.

An additional object of the invention is to provide the camera with novel means for transmitting motion from the film transporting mechanism to the double exposure preventing device.

The improved camera comprises rotary film transporting means preferably including a manually rotatable first wheel and a star wheel fixed to the shaft of the first wheel, arresting means including a toothed member (preferably a ratchet wheel) which is rigid with the first wheel and a pivotable arresting member movable into and from arresting engagement with the toothed member to thereby respectively permit or prevent rotation of the first wheel, movable tracking means preferably comprising a pivotable lever which is arranged to track the moving film during rotation of the first wheel and to thereby enter an oncoming perforation of the film to thus enable the arresting member to engage the toothed member, a double exposure preventing control member which is preferably a pivotably and reciprocably mounted slide and is movable from a first to a second position in response to rotation of the first wheel, and a regulating member which is preferably a disc and is rotatable with as well as relative to the first wheel. The disc is provided with a plurality (preferably three) angularly spaced equidistant first portions each of which is preferably provided with a notch. The control member has a complementary portion which can enter a notch to thereby permit engagement of the control member with the star wheel of the film transporting means and the arresting member also comprises a complementary portion which can enter a recess of the disc to thereby permit engagement of the arresting member with the toothed member.

The arrangement is such that, when the camera is loaded with film, the arresting member can engage the toothed member to thereby arrest the film transporting means only when the complementary portion of the arresting member extends into a notch of the regulating disc and when the tracking member actually engages a perforation of the film. When the film is removed from the camera, the arresting member can engage the toothed member as soon as the complementary portion of the arresting member is free to enter a notch of the regulating disc. Consequently, the camera can be demonstrated upon removal or prior to insertion of film.

The novel features which are considered as characteristic of the invention are set forth in particular in the appended claims. The improved photographic apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIG. is a perspective view of a portion of a still camera which embodies our invention.

DESCRIPTION OF THE PREFERRED EMBODIMENTS

Referring to the drawing in detail, there is shown a portion of a still camera which comprises a housing or body 10 (indicated by phantom lines), a double exposure preventing control member or slide 1 which can actuate the shutter, a film transporting wheel 2, a locking lever 3 for releasably holding the slide 1 in operative position shown in the drawing, an arresting lever 4 for the film transporting wheel 2, and a film tracking lever 6. The slide 1 has an elongated slot 1d which receives a guide pin 11; this guide pin 11 constitutes a pivot for the locking lever 3 and permits pivotal as well as lengthwise displacement of the slide. A helical spring 12 serves to bias the slide 1 in a direction to the right, as viewed in the drawing and in a clockwise direction with reference to the pin 11. The right-hand end of the spring 12 is connected to a post (not shown) in the housing 10. A second helical spring 13 biases the locking lever 3 in a counterclockwise direction so that the extension or lug 3a of the locking lever extends into the path of a projection or tooth 1a on the slide 1. A motion transmitting projection or arm 1b of the slide 1 moves past and into registry with a shutter blade (not shown) when the slide is shifted in the direction indicated by arrow 14. When the spring 12 is thereupon permitted to contract, it propels the motion transmitting arm 1b against the shutter blade and moves the latter to open position. The arm 1b then bypasses the shutter blade and enables the latter to return to closed position under the action of a return spring. A suitable shutter is disclosed in the copending application Ser. No. 689,916 of Ehgartner et al. which is assigned to the same assignee. The slide 1 further comprises a complementary portion or tooth 1c which can cooperate with a part of the film transporting mechanism. The latter includes the aforementioned wheel 2, a shaft 2c which is rigid with the wheel 2, and a star wheel 2a located at a level below a ratchet wheel 2b and fixed to the shaft 2c. The ratchet wheel 2b is fixed to the shaft 2c and forms part of an arresting means which further includes the lever 4. The shaft 2c carries a regulating disc 8 which is rotatable thereon and is biased by a spring 9 so that the underside of the disc 8 bears against the top face of a hub 2d on the shaft 2c. The parts 2d and 9 constitute a simple friction coupling which tends to rotate the regulating disc 8 with the shaft 2c. The star wheel 2a has six equidistant prongs and the disc 8 has three equidistant peripheral portions having recesses or notches 8a. The complementary portion or tooth 1c of the slide 1 can be moved by a prong of the star wheel 2a in the direction indicated by arrow 14 only when the tooth 1c can extend into one of the notches 8a in the disc 8. This insures that the film is advanced not only before but also while the slide 1 moves in the direction indicated by arrow 14, i.e., that the spring 12 is stressed during the last stage of film transport by the length of a frame. Such transport is accomplished by rotating the wheel 2 in a counterclockwise direction. This enables the pivotable tracking lever 6 to move its tip 6a into a perforation P of film in the housing 10 and that the tip 6a cannot enter the same perforation more than once.

When the wheel 2 is rotated by hand and the tooth 1c of the slide 1 extends into one of the notches 8a and hence into the path of a prong on the star wheel 2a, the wheel 2 can cause the slide 1 to move toward operative position, in the direction indicated by arrow 14, and to stress the spring 12. During such movement of the slide 1, the tooth 1a pivots the locking lever 3 by way of the tooth 1a and ultimately assumes the position which is shown in the drawing. Since the spring 13 biases the locking lever 3 in a counterclockwise direction, the extension 3a moves in front of the tooth 1a and thus locks the slide 1 in illustrated position in which the spring 12 is stressed. The arresting lever 4 has a downwardly extending lug 4c which abuts against the tooth 1a when the slide 1 is in the other end position in which the tooth 1a is located to the right of the extension 3a. However, when the slide 1 assumes or moves toward the illustrated position, the arresting lever 4 can turn in a counterclockwise direction under the action of a helical spring 5 and its lug 4e (which extends into a bifurcated portion 6b of the tracking lever 6) can pivot the tracking lever in a clockwise direction so that the tip 6a of the lever 6 engages the front side of the film in the housing 10 at the level of the row of perforations P and penetrates into the oncoming perforation while the wheel 2 rotates in a counterclockwise direction. When the tracking lever 6 pivots in a clockwise direction during entry of its tip 6a into the adjoining perforation P, the arresting lever 4 pivots in a counterclockwise direction and its tooth or pallet 4a engages the adjoining teeth of the ratchet wheel 2b; this takes place when a complementary portion or lug 4d of the arresting lever 4 can enter the adjoining notch 8a of the disc 8. Consequently, the disc 8, the shaft 2c and the wheels 2, 2a, 2b are held against further rotation. The arresting lever 4 has a blocking lug 4b which moves away from the path of a shoulder 7b on a reciprocable shutter release member 7 which can be depressed in the direction indicated by arrow 15 is normally held in the illustrated position by a helical spring 15a. Thus, the film transporting mechanism is arrested by the arresting lever 4 when the latter frees the release member 7 for movement in the direction indicated by arrow 15.

If the operator wishes to make an exposure, the release 7 is depressed (arrow 15) whereby the inclined face of a cam 7a on the release 7 engages the adjoining portion of the slide 1 and pivots this slide on the guide pin 11 in a counterclockwise direction. This moves the tooth 1a away from the extension 3a on the locking lever 3 so that the spring 12 is free to contract. Of course, the cam 7a also causes the tooth 1c of the slide 1 to move away from registry with the adjoining notch 8a and away from engagement with the adjoining prong of the star wheel 2a, i.e., the spring 12 is free to contract and to propel the slide 1 counter to the direction indicated by arrow 14. The arm 1b of the slide 1 then actuates the shutter in the aforedescribed manner, i.e., the shutter blade or blades are propelled to open positions and bypass the arm 1b so that they are free to return to closed positions under the action of one or more springs.

When the slide 1 is moved by the spring 12, its tooth 1a strikes against the lug 4c of the arresting lever 4 and rotates the latter in a clockwise direction to stress the spring 5. The arresting lever 4 thereby moves its pallet 4a away from the ratchet wheel 2b and simultaneously withdraws its lug 4d from the adjoining notch 8a of the disc 8. The lug 4e of the arresting lever 4 pivots the tracking member 6 in a counterclockwise direction and withdraws the tip 6a from the adjoining perforation P. When the operator's finger is moved away from the release member 7, the spring 15a expands and returns the member 7 to the illustrated position whereby the projection 4b moves into registry with the shoulder 7b (spring 12) and prevents repeated depression of the member 7 prior to next manipulation of the film transporting mechanism.

When the operator thereupon decides to rotate the film transporting wheel 2 in a counterclockwise direction, the shaft 2c causes the film to advance in the direction indicated by arrow 17 before the tooth 1c enters the next notch 8a and moves into the path of a prong on the star wheel 2a. This insures that the illustrated perforation P is moved past the tip 6a of the tracking lever 6 before the latter is pivoted in a clockwise direction so that its tip can enter the next-following perforation. When the wheel 2 is rotated subsequent to removal of fully exposed film and prior to insertion of fresh film into the body 1, the lug 4d of the arresting lever 4 bears against the periphery of the disc 8 and enters the oncoming notch 8a to permit engagement of the pallet 4a with the ratched wheel 2b before the slide 1 reaches the end portion shown in the drawing. This is due to the fact that the disc 8 is provided with three equidistant notches 8 a. If the release member 7 is thereupon depressed (without any film in the camera), the tooth 1c is moved away from the star wheel 2a and away from the adjoining notch 8a so that the slide 1 is free to move counter to the direction indicated by arrow 14; such movement of the slide 1 covers only a portion of the maximum possible displacement of the slide, i.e., the spring 12 is not stressed to the extent permitted by the length of the slot 1d in the slide; therefore, the exposure time is not the same as when the slide is released after it completes a movement to the full extent permitted by the slot 1d and guide pin 11. However, the mode of operation of the camera can be demonstrated without any film in the housing 10.

If desired, the portion 1b of the slide 1 can be omitted, i.e., the shutter can be actuated by a separate member which is moved or caused to move in response to depression of the release member 7.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is set forth in the appended.

We claim:

1. In a camera for use with film of the type having a row of perforations, one for each film frame, rotary film transporting means; arresting means including a toothed member rotated by said transporting means and in arresting member movable into and from engagement with said toothed member; movable tracking means operatively connected with said arresting member and arranged to track the film during rotation of said transporting means and to thereby enter an oncoming perforation to thus enable said arresting member to engage said toothed member; a double exposure preventing control member movable from a first to a second position in response to rotation of said transporting means; and a regulating member normally rotating with said transporting means and having a plurality of angularly spaced first portions, said control member and said arresting member having complementary portions each engageable with and disengageable from a first portion of said regulating member whereby the complementary portion of said control member effects engagement of said control member with said transporting means and the complementary portion of said arresting member effects engagement of said arresting member with said toothed member when such complementary portions engage first portions of said regulating member.

2. A structure as defined in claim 1, wherein said toothed member is a ratchet wheel and said regulating member is a disc, said first portions being recesses provided at the periphery of said disc, said film transporting means comprising a second toothed member arranged to move said control member between first and second positions when the complementary portion of said control member extends into one of said recesses.

3. A structure as defined in claim 2, wherein said complementary portions are teeth provided on said control member and said arresting member.

4. A structure as defined in claim 1, further comprising friction coupling means connecting said regulating member to said transporting means, said coupling means comprising means for biasing said regulating member against a portion of said transporting means.

5. A structure as defined in claim 1, wherein the complementary portion of said control member is free to engage with and to receive motion from said transporting means while it engages a first portion of said regulating member.

6. A structure as defined in claim 1, wherein said arresting member comprises a first projection which is engageable with said transporting means and a second projection which is engageable with a first portion of said regulating member and constitutes the complementary portion of said arresting member.

7. A structure as defined in claim 1, wherein said transporting means comprises a six-pronged star wheel whose prongs are arranged to move said control member and wherein said regulating member is provided with three equidistant first portions.

8. A structure as defined in claim 1, further comprising first and second biasing means for respectively urging said control member and said arresting member against said transporting means.

9. A structure as defined in claim 8, further comprising release means movable from a first to a second position to thereby disengage said control member from said transporting means in stressed condition of said first biasing means.

10. A structure as defined in claim 9, further comprising locking means movable to and from a locking position in which said control member is held by said locking means against movement under the action of said first biasing means prior to operation of said release means, said control member including a portion arranged to disengage said arresting member from said transporting means in response to movement of said control member under the action of said first biasing means.